No. 824,517.　　　　　　　　　　　　　　　PATENTED JUNE 26, 1906.
W. E. THOMPSON.
FLY TRAP.
APPLICATION FILED DEC. 8, 1904.
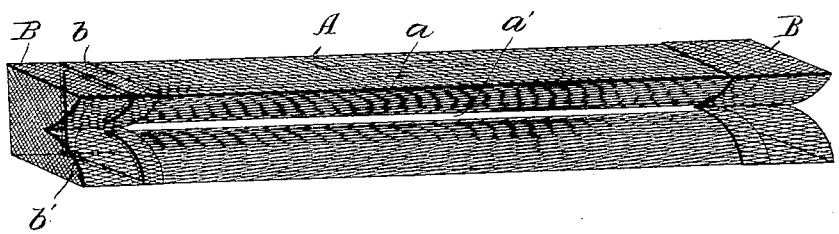
WITNESSES:
INVENTOR
WILLIAM E. THOMPSON
BY
ATTORNEYS

UNITED STATES PATENT OFFICE.

WILLIAM E. THOMPSON, OF TECUMSEH, NEBRASKA.

FLY-TRAP.

No. 824,517.  Specification of Letters Patent.  Patented June 26, 1906.

Application filed December 8, 1904. Serial No. 235,987.

*To all whom it may concern:*

Be it known that I, WILLIAM E. THOMPSON, a citizen of the United States, residing at Tecumseh, in the county of Johnson and State of Nebraska, have made certain new and useful Improvements in Fly-Traps, of which the following is a specification.

This invention is an improvement in fly-traps; and it consists in certain novel constructions and combinations of parts, as will be hereinafter described and claimed.

In the drawing the figure is a perspective view of a trap embodying my invention and adapted for use below or above a window-sash.

By my invention I seek to provide a novel form of trap adapted to be placed in an opening or openings in the wall of a house or room and having a tapering inlet through which flies may pass to the interior of the trap and from which they cannot escape.

An important feature of my invention is the idea of placing the trap so the flies will be caught while they are attempting to enter the house, and therefore I arrange the inlet on the outer side of the trap and taper it inwardly to a contracted opening through which the flies may pass into the trap, suitable means being provided for removing the flies whenever desired. As suggested, the inlet is arranged on the outer side of the trap, so that the flies in flying toward the screen will light directly upon the entrance-plate and can progress directly toward the interior of the room. This location of the inlet is of importance in increasing the efficiency of the trap.

As shown, the trap includes a body portion A and end portions B, telescopically connected with the body portion A and coinciding therewith as to the inlet portion of the trap, as will be understood from the drawing. The portions A and B of the trap are formed with upright back plates, top plates, and the inlet-plates *a* and *b*, which converge toward the inlet-opening *a'* and *b'*, through which the flies enter the trap, this inlet-opening being contracted, so that the flies cannot pass outwardly when they once enter the trap. The sections A and B of the trap may be made of any suitable material; but it is preferred to employ wire-cloth having the inlet-opening, as shown. If desired, the inlet-openings may be multiplied and a number of the inlet-openings of the converging form shown be employed. This box (shown in the drawing) is designed to be placed under or above a window-sash or fitted into a suitable space at the top or bottom of a door or window screen with the inlet toward the outside. The telescopic ends are useful in that they permit the adjustment of the trap longitudinally to suit openings of different widths and also form convenient means whereby the flies may be removed from the trap when it is desired to empty and cleanse the same.

The construction, it will be noticed, is quite important in that it permits the entire width of the window being utilized as an inlet for the flies and can be readily adjusted to any suitable width of window, and the adjusting means also form bars whereby the contents of the box may be discharged.

Having thus described my invention, what I claim as new, and desire to secure by Letters Patent, is—

The herein-described fly-trap consisting of the elongated body portion open at both ends and having one of its sides provided with upper and lower inlet-plates extending from the top and bottom of the body portion toward each other and deflected inwardly and terminating at their inner free edges in close proximity forming a longitudinally-extending inlet-opening, and end sections closed at their outer ends and conforming in cross-section to that of the body portion and fitting telescopically at their inner ends to the ends of the body portion, all substantially as and for the purpose set forth.

In testimony whereof I have signed my name to this specification in the presence of two subscribing witnesses.

WILLIAM E. THOMPSON.

Witnesses:
  JOHN R. PIERSON,
  OSCAR DOUGLAS.